Jan. 13, 1959 L. C. McCULLOUGH 2,868,867
INSULATING BUSHING
Filed Dec. 26, 1956

INVENTOR.
Lester C. McCullough
BY Lee H Kaiser
Attorney

United States Patent Office 2,868,867
Patented Jan. 13, 1959

2,868,867
INSULATING BUSHING

Lester C. McCullough, Zanesville, Ohio, assignor to McGraw-Edison Company, a corporation of Delaware Application December 26, 1956, Serial No. 630,563

3 Claims. (Cl. 174—153)

This invention relates to an insulating bushing construction for accommodating a conductor passing through the tank wall of an electrical apparatus.

Electrical transformers and other stationary induction apparatus usually include a casing enclosing a core and coil assembly and a bushing construction within an opening in the casing wall through which electrical connection is made to the apparatus winding. The bushing construction conventionally includes an electrical terminal for an external line lead, and the entire bushing is subject to movement when a lineman tightens an external line lead to the electrical terminal.

It is an object of the invention to provide an improved bushing construction, permitting electrical connection to a winding inside the casing of an electrical apparatus, which is simple in construction and inexpensive to manufacture.

It is a further object of the invention to provide an improved bushing construction, permitting connection or disconnection between an external line lead and a winding lead of an electrical apparatus, which has novel means for locking the bushing against rotation.

Other objects and advantages of the invention will be apparent from the following description when taken in conjunction with the accompanying drawing wherein.

Figure 1:
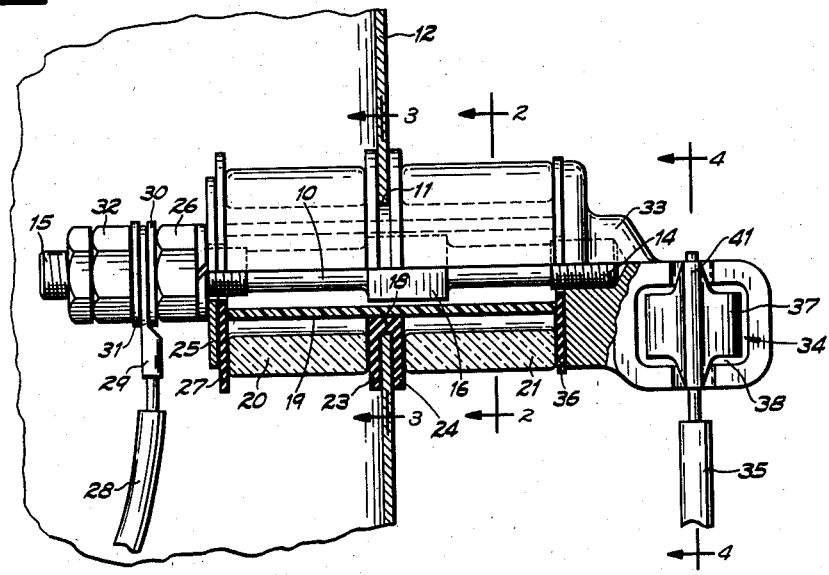
Fig. 1 is an elevation view, partly in section, illustrating the preferred embodiment of the invention.
Figure 2:
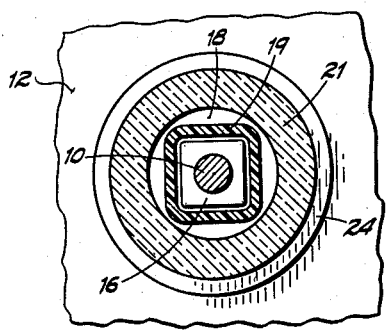
Fig. 2 is a sectional view taken along line 2—2 of Fig. 1.
Figure 3:
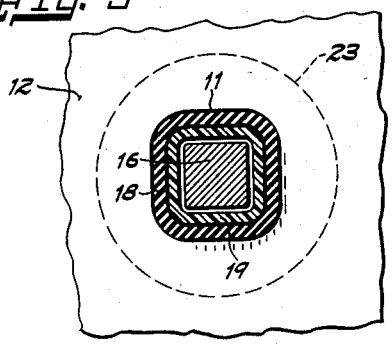
Fig. 3 is a sectional view taken along line 3—3 of Fig. 1.
Figure 4:
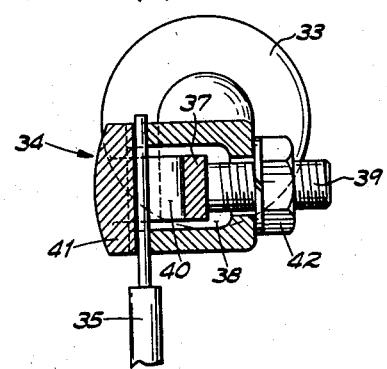
Fig. 4 is a sectional view taken along line 4—4 of Fig. 1.

Referring to the drawing, the preferred embodiment of my improved insulating bushing includes a conducting bolt 10 extending through a noncircular aperture 11, preferably square (see Fig. 3), in the wall 12 of an electrical apparatus casing. The conducting bolt 10 has threaded portions 14 and 15 at opposite ends thereof and also has, intermediate its ends, a portion 16 noncircular in cross section, preferably square, complementary to the noncircular aperture 11 in the casing wall 12. A resilient insulating grommet 18, preferably of rubber, having a noncircular opening therethrough, preferably square similar to aperture 11, fits within the noncircular aperture 11 and insulates the conducting bolt 10 from the edges of the wall 12 defining the aperture 11. An insulating tube 19 having a noncircular cross section, preferably square similar to that of aperture 11, and preferably constructed of non-hygroscopic material such as glass reinforced polyester resin is circumjacent the bolt 10 within the noncircular aperture 11. The noncircular portion 16 of bolt 10 fitting relatively snugly within noncircular-in-cross-section insulating tube 19 which in turn extends through the noncircular opening in grommet 18 prevents turning of bolt 10 within noncircular aperture 11 and provides exceptionally long creepage distances between bolt 10 and the wall 12. In many embodiments an insulating tube 19 of fibreboard have been found satisfactory.

Insulating tubular members 20 and 21, preferably of porcelain, are disposed on opposite sides of the casing wall 12 circumjacent the insulating tube 19. The resilient insulating grommet 18 has annular portions 23 and 24 surrounding the marginal wall edge which defines the aperture 11 both interior and exterior of the wall 12, and portions 23 and 24 of grommet 18 serve as resilient gaskets against which the tubular porcelain members 20 and 21 may be clamped. A washer 25 circumjacent the bolt 10 within the casing 12 is adapted to bear against one end of tubular porcelain member 20, and a nut 26 threadably engages the end 15 of bolt 10 interior of the casing. A resilient insulating gasket 27 preferably of rubber is disposed between washer 25 and tubular porcelain member 20. Suitable means are provided to electrically connect a lead 28 from an electrical winding (not shown) within the casing to the conducting bolt 10. For example, a termnial 29 secured by suitable means such as solder to the bare end of lead 28 may fit over bolt 10 and be clamped between washers 30 and 31 when nut 32 threadably engaging bolt 10 is tightened.

A threaded metallic connector body 33 having suitable terminal means 34 for securing an external line lead 35 threadably engages the threaded portion 14 of conductor bolt 10 exterior of the casing. The connector body 33 is adapted to bear against the end of tubular porcelain member 21, and a resilient gasket 36 of insulating material, preferably rubber, is disposed between the end of the porcelain tube 21 and the connector body 33. The nut 26 and the connector body 33 threadably engaging opposite ends of bolt 10 cooperate to maintain the tubular porcelain members 20 and 21 clamped against opposite sides of the wall 12 with the portions 23 and 24 of the resilient grommet 18 compressed therebetween.

The terminal means 34 may comprise a threaded eyebolt 37 adapted to fit within a compartment 38 in connector body 33 and having a threaded shank 39 extending through an aperture in connector body 33. The eyebolt 37 may have an aperture 40 for receiving the bare end of external line lead 35 and a headed portion 41 adapted to clamp the bare end of lead 35 against connector body 33 when a nut 42 is tightened on threaded shank 39.

Preferably bolt 10 is preassembled to connector body 33 and these parts soldered together at the threaded portion 14 before they are assembled in the bushing. This prevents accidental disassembly of the bushing which might occur if connector body 33 became unthreaded from bolt 10 while nut 42 was being turned on eyebolt 37.

The noncircular portion 16 on bolt 10 fitting within noncircular aperture 11, positively locks the bushing against rotation. Further, it will be apparent that the grommet 18 and insulating tube 19 cooperate to provide exceptionally long creepage distances between bolt 10 and the casing wall 12 which assure high voltage breakdown strength, and voltage breakdown tests prove that my novel bushing easily withstands, without failure, the high potential to which electrical transformers and other stationary induction apparatus are subjected. These breakdown tests disclose that the grommet 18, which not only acts as a gasket but also prevents flashover to the casing at the edge defining the opening 11, is particularly effective in assuring high voltage breakdown strength for the bushing of my invention.

While only a single embodiment of my invention has been disclosed and described, variations and modifications thereof will be apparent to those skilled in the art, and consequently it is intended in the appended claims to cover all such modifications and variations which fall within the true spirit and scope of the invention.

I claim:

1. In combination, an electrical apparatus having a metallic casing, said casing having a noncircular aperture through a wall thereof, a conducting stud extending through said aperture and having a noncircular portion intermediate its ends complementary to said noncircular aperture, whereby said stud is locked against rotation, first and second insulating tubes circumjacent said stud and disposed against the interior and exterior respectively of said wall, means engaging said stud external of said casing adapted to bear against said second insulating tube, gasket means between said last-named means and said second insulating tube, gasket means between said second insulating tube and the exterior of said wall, insulating means between said noncircular portion of said stud and the edges of said wall defining said noncircular aperture, and means adapted to bear against said first insulating tube and engaging the end of said stud interior of said casing, both of said means engaging the ends of said stud maintaining said insulating tubes in abutting relation to the walls of said casing.

2. In combination, an encased electrical apparatus in which one wall of the casing has a noncircular aperture therethrough, a conducting stud threaded at its ends extending through said aperture and having intermediate its ends a noncircular portion complementary to said noncircular aperture, whereby rotation of said stud is prevented, an insulating tube having a noncircular cross section circumjacent said noncircular portion of said stud between the stud and the edges of said wall defining said noncircular aperture, first and second porcelain tubular members circumjacent said stud and disposed adjacent the interior and exterior respectively of said wall, first threaded means engaging the exterior threaded end of said stud and bearing against said first tubular porcelain member and carrying terminal means permitting connection to an external line lead, second threaded means engaging the interior end of said stud and bearing against said second tubular porcelain member, and gasket means between one of said tubular members and said wall and gasket means between said one tubular porcelain member and said threaded means bearing against it, said first and second threaded means maintaining said tubular porcelain members clamped against opposite sides of said wall.

3. In combination, an encased electrical apparatus in which one wall of the casing has a noncircular aperture therethrough, a conducting stud extending through said aperture and having intermediate its ends a noncircular portion complementary to and within said noncircular aperture, an insulating tube having a noncircular cross section surrounding said noncircular portion of said stud, a pair of tubular porcelain members circumjacent said stud and disposed on opposite sides of said wall, a resilient grommet of insulating material surrounding the edges of said wall defining said noncircular aperture and having portions adjacent the interior and exterior surfaces of said wall providing compressible gaskets between said tubular porcelain members and said wall, first means engaging the end of said stud exterior of said casing and bearing against one of said tubular porcelain members and carrying terminal means permitting electrical connection to an external line lead, gasket means between said first means and said one tubular porcelain member, and second means engaging the end of said stud interior of said casing and cooperating with said first means for said wall with said portions of said grommet compressed therebetween.

References Cited in the file of this patent

UNITED STATES PATENTS

| | | |
|---|---|---|
| Re. 22,086 | Treanor | Apr. 28, 1942 |
| 2,278,974 | Christensen | Apr. 7, 1942 |
| 2,450,273 | Dubilier | Sept. 28, 1948 |

UNITED STATES PATENT OFFICE
CERTIFICATE OF CORRECTION

Patent No. 2,868,867  January 13, 1959

Lester C. McCullough

It is hereby certified that error appears in the printed specification of the above numbered patent requiring correction and that the said Letters Patent should read as corrected below.

Column 4, line 28, after "for" insert -- clamping said tubular members against opposite sides of --.

Signed and sealed this 21st day of April 1959.

(SEAL)
Attest:

KARL H. AXLINE
Attesting Officer

ROBERT C. WATSON
Commissioner of Patents